United States Patent Office 2,928,823
Patented Mar. 15, 1960

2,928,823
MONOAZO DYESTUFFS AND THEIR METAL COMPLEX COMPOUNDS

Otto Senn, Ariesheim, near Basel, Hanspeter Uehlinger, Binningen, and Walter Wehrli, Riehen, near Basel, Switzerland, assignors to Sandoz Ltd., Basel, Switzerland, a Swiss firm No Drawing. Application August 18, 1958
Serial No. 755,414

Claims priority, application Switzerland August 21, 1957

7 Claims. (Cl. 260—146)

The present invention relates to a process for the production of monoazo dyestuffs and their metal complex compounds. The process consists in reacting 1 mol of a hydrazinobenzene, which contains in ortho-position to the hydrazino group a substituent capable of taking part in metal complex formation or capable of being converted so as to perform this function, with 1 mol of an ortho-diketone and treating the so formed monoazo dyestuff in substance or on the fiber with a metal yielding agent, preferably one yielding chromium or cobalt.

The monoazo dyestuffs obtained according to the present invention correspond to the formula

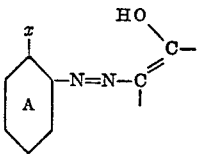

which is the enolized form of a α-ketohydrazone obtained by monocondensation of an ortho-diketone with the phenylhydrazine of the formula

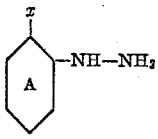

In these formulae $x$ represents a substituent capable of taking part in metal complex formation or capable of being converted so as to perform this function and the nucleus may bear substituents other than carboxylic acid or sulfonic acid groups. For the production of these monoazo dyestuffs it is desirable to choose the reactants so that at least one of them contains an alkyl sulfonyl group or a sulfonic acid amide group, the latter of which may be substituted on the nitrogen atom.

The monoazo dyestuffs here disclosed are suitable for dyeing wool by the one-bath chrome process. The metal complex compounds are of value for the dyeing and printing of wool, silk, leather and polyamide fibers; those which have sufficiently high solubility in organic solvents are of interest for dyeing manufactured fibers in the mass prior to spinning and for coloring plastics and lacquer media.

The dyeings and colorings obtained possess good fastness to light and wet treatments such as washing, milling, perspiration, potting and acids. Hydrazinobenzenes conforming to the present definition can be produced, for example, according to the particulars given in German Patent 258,017. Preference is given to the hydrazinobenzenes which contain an alkylsulfonyl group or a sulfonic acid amide group, the latter of which may be substituted on the nitrogen atom.

Other substituents which enter into consideration for the above-defined hydrazinobenzenes are e.g. halogen atoms (chlorine), alkyl groups (methyl), the nitro group, acylamino groups (acetylamino); these substituents may be present beside a sulfonic acid amide or alkyl sulfonyl group.

Of the sulfonic acid amide and the alkyl sulfonyl groups may be mentioned the sulfonic acid amide, sulfonic acid methylamide, sulfonic acid dimethylamide, sulfonic acid-(2'-hydroxy)-ethylamide, sulfonic acid di-(2'-hydroxyethyl)-amide, sulfonic acid (2'- or 3'-hydroxy)-propylamide, sulfonic acid-(3'-methoxy)-propylamide, sulfonic acid-(2'-ethoxy)-ethyl-amide, sulfonic acid phenylamide, sulfonic acid methylphenylamide or chlorophenylamide, sulfonic acid-(2'-carboxy)-phenylamide, sulfonic acid-N-methyl-N-phenylamide, sulfonic acid-N-(2'-hydroxy)-ethyl-N-phenylamide and the methyl sulfonyl group.

Examples of suitable ortho-diketones are 1.2-benzoquinone, 9.10-phenanthrenequinone, acenaphthenequinone and isatin, dibromoisatin, N-methylisatin and N-acetylisatin.

The reaction of the hydrazinobenzene with the ortho-diketone is conducted preferably in an aqueous, strongly acid medium. In most instances the condensation product is precipitated; it is filtered off, dissolved in excess alkali and reprecipitated in the form of the alkali metal salt, if desired after clarification of the solution by the addition of salt.

The monoazo dyestuffs are converted into their metal complex compounds preferably with chromium or cobalt compounds. The metallization is best carried out in an aqueous solution or an organic medium, for example formamide or ethyl glycol, or in the concentrated aqueous solution of an alkali metal salt of a low molecular aliphatic monocarboxylic acid. It is desirable to allow a quantity of metal-yielding agent containing at least one but less than two atoms of metal to act upon two molecules of the monoazo dyestuff.

The metal complex compounds so obtained are precipitated from aqueous medium by the addition of salt, the organic metallizing solution being first run into water when the operation is carried out in non-aqueous medium. They are then filtered off, washed if desired, and dried.

The metal-containing azo dyestuffs so formed are metal complex compounds in which essentially one metal atom is combined with two molecules of the monoazo compound. They can be described as 1:2 complexes in which one molecule proportion of the monoazo compound is combined with approximately 0.3 to 0.7 atom proportion of metal.

In the examples which follow the parts and percentages are by weight and the temperatures in degrees centigrade.

EXAMPLE 1

21.7 parts of 1-hydroxy-2-hydrazinobenzene-4-sulfonic acid methylamide are reacted in a strongly mineral acid solution with 18.2 parts of acenaphthenequinone finely suspended in water at 80–100° C. After about two hours condensation is complete. The precipitated dyestuff is filtered off, dissolved in water with excess sodium hydroxide, the solution filtered if necessary and the monoazo dyestuff precipitated by the addition of common salt. It is filtered off, dried and ground to give a dark powder which dyes wool by the one-bath chrome process in green shades of good fastness to light, washing, milling, plotting and acids.

A similar dyestuff is obtained when in place of 21.7 parts of 1-hydroxy-2-hydrazinobenzene-4-sulfonic acid methylamide, 27.5 parts of 1-hydroxy-2-hydrazinobenzene-4-sulfonic acid-(3'-methoxy)-propylamide are employed for condensation.

100 parts of prewetted wool fabric are introduced at 30° into the solution of 2 parts of the monoazo dyestuff described in the first paragraph of this example, 10 parts of anhydrous sodium sulfate, 6 parts of ammonium sulfate and 1 part of sodium bichromate in 6000 parts of water. The bath is heated to the boil in the course of 30 minutes and maintained at the boil for 90 minutes, the evaporated water being replaced from time to time. The dyed wool is then removed from the bath, rinsed with water and dried.

EXAMPLE 2

31.8 parts of the monoazo dyestuff obtained according to Example 1, paragraph 1, are dissolved in 400 parts of formamide. The solution is heated to 100–110° and 30 parts of crystallized chromic ammonium sulfate are added to it in about 30 minutes. The mixture is maintained at 100–110° until formation of the chromium complex compound is complete, whereupon the chroming mass is diluted with 4 to 5 times its amount of water and the chromium complex compound salted out, filtered off, dried and ground. The chromium-containing dyestuff is a dark powder which dyes wool, silk, polyamide fibers and leather in green shades of good fastness to light, washing and milling.

EXAMPLE 3

43.9 parts of the monoazo dyestuff produced according to Example 1, paragraph 2, are dissolved with 30 parts of an 18% cobalt acetate solution (equivalent to 1.77 parts of cobalt) in 400 parts of water at 80°. By dropwise addition of sufficient 10% caustic soda the pH value of the solution is brought to 9.5. On completion of metallization the cobaltiferous dyestuff is isolated and dried, giving a dark powder which dyes wool, silk, leather and polyamide fibers in olive-green shades having good fastness to light, washing and milling.

2 parts of the cobalt-containing azo dyestuff thus obtained are dissolved in 4000 parts of water at 40–50°. 100 parts of a previously wetted out wool fabric are introduced into this dyebath and 2 parts of 100% acetic acid are dropped in. The bath is then brought to the boil in 30 minutes and boiled for 45 minutes. The dyed wool is then taken out, rinsed with water and dried; the dyeing shows very good fastness to light, washing and milling.

Further examples are set out in the following table.

PARAGRAPH 2

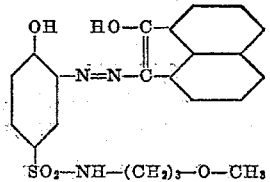

EXAMPLE 2

The chromium complex compound containing, bound in complex union with one atom of chromium, substantially two molecules of the monoazo dyestuff of Example 1, paragraph 1.

EXAMPLE 3

The cobalt complex compound containing, bound in complex union with one atom of cobalt, substantially two molecules of the monoazo dyestuff of Example 1, paragraph 2.

Having thus disclosed the invention what we claim is:

1. A member selected from the group consisting of a monoazo dyestuff which is free from sulfonic acid groups, is free from carboxylic acid groups standing in a position other than ortho to the azo group and corresponds to the formula

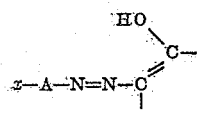

and the chromium and cobalt complex compounds thereof, wherein $x$ stands in ortho-position to —N=N— and represents a member selected from the group consisting of a hydroxy and a carboxy group,

represents the radical of a member selected from the group consisting of 1-hydroxy-acenaphthene, 9-hy-

Table

| Example No. | Hydrazinobenzene | ortho-Diketone | Shade of the Dyeings on Wool with— | | |
|---|---|---|---|---|---|
| | | | the monoazo dyestuff chromed on the fiber | the chromium-containing azo dyestuff | the cobalt-containing azo dyestuff |
| 4 | 1-hydroxy-2-hydrazinobenzene-4-sulfonic acid amide. | isatin | red | red | orange-brown. |
| 5 | 1-hydroxy-2-hydrazinobenzene-4-sulfonic acid-(3'-methoxy)-propylamide. | phenanthrenequinone. | blue-violet | blue-violet | bordeaux. |
| 6 | 1-hydroxy-2-hydrazino-4-methylsulfonylbenzene. | acenaphthenequinone. | green | green | olive. |
| 7 | 1-carboxy-2-hydrazinobenzene. | isatin | orange | orange | yellow. |
| 8 | 1-hydroxy-2-hydrazinobenzene-4-sulfonic acid-morpholide. | acenaphthenequinone. | green | green | olive. |
| 9 | 1-hydroxy-2-hydrazinobenzene-4-sulfonic acid amide. | 5,7-dibromoisatin | red | red | brown-orange. |
| 10 | do | N-methylisatin | do | do | Do. |
| 11 | do | N-acetylisatin | do | do | Do. |
| 12 | do | acenaphthenequinone. | green | green | olive-green. |

Formulae of representative dyestuffs of the foregoing examples are as follows:

EXAMPLE 1

PARAGRAPH 1

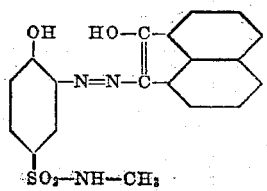

droxyphenanthrene, 2-hydroxyindole, 2-hydroxy-5,7-dibromoindole, 1-methyl-2-hydroxyindole and 1-acetyl-2-hydroxyindole, and A represents a member selected from the group consisting of a further unsubstituted benzene radical and a further substituted benzene radical, the substituents being selected from the group consisting of methyl, chlorine, nitro, methylsulfonyl, sulfonic acid amide, sulfonic acid lower alkylamide, sulfonic acid lower hydroxyalkylamide, sulfonic acid lower alkoxyalkylamide, sulfonic acid phenylamide, sulfonic acid cyclohexylamide and sulfonic acid morpholide.

2. A metal complex compound containing, bound in complex union with one atom of a metal selected from the group consisting of chromium and cobalt, substantially two molecules of a monoazo dyestuff free from sulfonic acid and carboxylic acid groups which corresponds to the formula

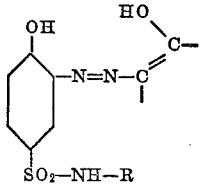

wherein R represents a member selected from the group consisting of hydrogen, methyl and methoxypropyl, and

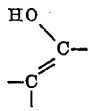

represents the radical of 1-hydroxyacenaphthene.

3. The chromium complex compound containing, bound in complex union with one atom of chromium, substantially two molecules of the monoazo dyestuff of the formula

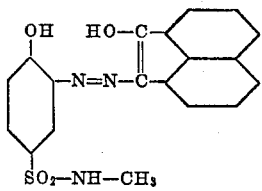

4. The cobalt complex compound containing, bound in complex union with one atom of cobalt, substantially two molecules of the monoazo dyestuff of the formula

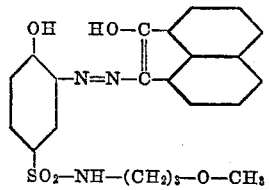

5. A metal complex compound containing, bound in complex union with one atom of a metal selected from the group consisting of chromium and cobalt, substantially two molecules of a monoazo dyestuff free from sulfonic acid and carboxylic acid groups which corresponds to the formula

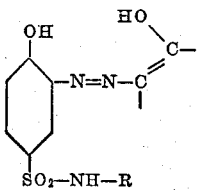

wherein R represents a member selected from the group consisting of hydrogen, methyl and methoxypropyl, and

represents the radical of 2-hydroxy-5,7-dibromo-indole.

6. The chromium complex compound containing, bound in complex union with one atom of chromium, substantially two molecules of the monoazo dyestuff of the formula

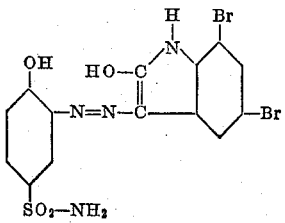

7. The cobalt complex compound containing, bound in complex union with one atom of cobalt, substantially two molecules of the monoazo dyestuff of the formula

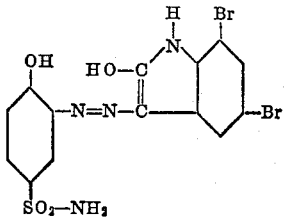

References Cited in the file of this patent
UNITED STATES PATENTS 2,856,397     Pfitzner et al. _____ Oct. 14, 1958

OTHER REFERENCES

Zincke: Ber. Deut. Chem., 16, pp. 1563–1564 (1883).
Zincke et al.: Ber. Deut. Chem., 17, p. 3032 (1884).
Taylor et al.: "Sidgwick's Organic Chemistry of Nitrogen," 1949, pp. 439–440.